United States Patent [19]

Baer

[11] Patent Number: 5,143,053
[45] Date of Patent: Sep. 1, 1992

[54] SOLAR COLLECTOR TUBE PLATE
[75] Inventor: Stephen C. Baer, Albuquerque, N. Mex.
[73] Assignee: Zomeworks Corporation, Albuquerque, N. Mex.
[21] Appl. No.: 667,730
[22] Filed: Mar. 11, 1991
[51] Int. Cl.[5] .................................. F24J 2/24
[52] U.S. Cl. ................... 126/446; 126/418; 165/83; 165/81
[58] Field of Search .......... 126/449, 446, 447, 420, 126/418; 165/81, 83

[56] References Cited

U.S. PATENT DOCUMENTS

| 3,039,453 | 6/1962 | Andrassy | 126/447 |
|---|---|---|---|
| 3,823,703 | 7/1974 | Lanciault | 126/271 |
| 3,859,980 | 1/1975 | Crawford | 126/271 |
| 4,227,512 | 10/1980 | Riley | 126/420 |
| 4,308,856 | 1/1982 | Durand | 126/418 |
| 4,513,732 | 4/1985 | Feldman | 126/446 |
| 4,637,375 | 1/1982 | Larkin | 126/434 |
| 4,782,889 | 11/1988 | Bourne | 165/49 |

FOREIGN PATENT DOCUMENTS

| 2420097 | 12/1979 | France. |  |
| 2456915 | 12/1980 | France. |  |
| 217155 | 12/1983 | Japan | 126/447 |

Primary Examiner—Carroll B. Dority
Attorney, Agent, or Firm—Townsend and Townsend

[57] ABSTRACT

The present invention provides an improved liquid conduit for a device such as a solar collector. A tube of stretchable material carries the liquid. A rigid elongate channel has side walls in contact with and enclosing the tube about at least 50% but not the entirety of its circumference. The channel allows the tube to expand radially along part of its circumference when the liquid expands due to freezing.

8 Claims, 1 Drawing Sheet

SOLAR COLLECTOR TUBE PLATE

BACKGROUND OF THE INVENTION

The present invention relates to a tube plate for a device such as a solar collector having a liquid conduit which does not rupture when the liquid freezes.

A problem that has plagued solar collector design is the fact that the water which passes through conduits in the collector expands when it freezes. The function of the water in the solar collector is to absorb heat, and it is thus essential to provide excellent heat conductivity through the walls of the conduit from the ambient environment to the water. The conduit containing the water cannot be thermally insulated from the ambient environment, and the water will freeze when the ambient environment is sufficiently cold. Expansion of the water as it freezes will cause conventional metal pipes to burst.

The water conduits in a solar collector can be made of a plastic such as high-density polyethylene which is somewhat elastic. Such plastics are able to stretch when the water freezes, then shrink back to their normal size when the ice thaws. However, such plastics are not truly elastic, and tend to become hard and brittle with age. After many cycles, such plastics will fail because they are not able to stretch and shrink as a true rubber. Solar collectors are designed to operate reliably for years, and such plastics typically cannot be used because of their tendency to fail over time.

True rubber conduits are able to stretch and shrink as required when the water freezes in a solar collector. However, rubber conduits are typically not used in a solar collector because they are subject to failure under pressure in normal service. As the radius of a rubber hose increases, the walls of the hose need greater and greater strength to contain the same pressure because the stress in the walls of the conduit is directly proportional to the radius of the hose and inversely proportional to its wall thickness. A small increase in the diameter of a rubber tube causes a disproportionately large stress increase by the combined increase in radius and decrease in wall thickness. As a result, true rubber hoses often form aneurisms in which a portion of the hose expands rapidly and fails in normal use. This problem can be counteracted to some extent by making the walls of the rubber hose thicker, but thicker walls have the undesirable effect of decreasing the thermal conductivity of the conduit and inhibiting heat transfer to the water.

Various types of specialized conduits and peripheral devices have been tried to accommodate the expansion of the water in a solar collector when it freezes, but these techniques have met with limited success. U.S. Pat. No. 4,308,856 to Durand shows a conduit having a FIG. 8 shape contained inside an expansible support, but such complex structures are difficult to implement in a cost effective solar collector. Use of an expansible bladder in the header where it presumably will not cool to the freezing point is shown in U.S. Pat. No. 4,227,512. In U.S. Pat. No. 4,637,375, an elastic material inside a rigid metal is designed to absorb the expansion of the water when it freezes. None of these techniques have provided a simple, cost effective mechanism for protecting the conduits in a solar collector when the water freezes.

In many solar collectors, heat exchangers are provided for cycling warmer water through the collector when necessary to prevent freezing. With this technique the heat which the solar collector is designed to collect is essentially wasted when it is used to prevent the water in the collector from freezing. Also, use of a heat exchanger requires that the water be pumped through the system even when solar energy is not being collected, introducing another undesirable inefficiency into the system.

SUMMARY OF THE INVENTION

The present invention provides an improved liquid conduit for a device such as a solar collector. A tube of stretchable material carries the liquid. A rigid elongate channel has side walls in contact with and enclosing the tube about at least 50% but not the entirety of its circumference. The channel allows the tube to expand radially along part of its circumference when the liquid expands due to freezing.

As the tube of the present invention expands, the radius of curvature of the expanding portion of the tube does not increase because the tube is confined by the channel. In the preferred embodiment of the present invention, the sidewalls of the channel taper inwardly, so that the radius of curvature of the expanding portion of the tube decreases as the tube expands. While the thickness of the tube will decrease slightly as the liquid expands, tending to increase the stress in the walls of the tube, the decreasing radius of curvature will tend to lower the stress, meaning that the stress in the walls of the tube will remain essentially constant. As a result, the chance of an aneurism forming in the tube, which could result in tube failure, is reduced to the point that the tube provides a safe and reliable conduit for the liquid.

In the preferred embodiment of the present invention, the elongate channel is formed as an integral part of the solar collector plate, which is typically aluminum. Aluminum absorbs heat, which is readily conducted to the water in the tube. Because the tube is confined, the walls of the tube can be relatively thin and do not present a significant thermal barrier to the desired heat transfer from the aluminum plate to the liquid. Indeed, the presence of the integral elongate channel partially circumscribing the tube enhances the heat transfer effect.

The novel features which are characteristic of the invention, as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
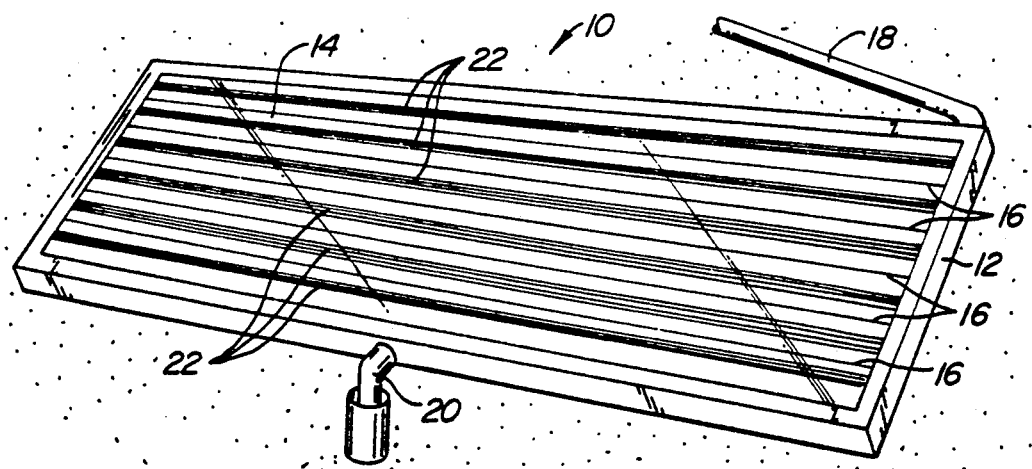
FIG. 1 is a perspective view of a solar collector employing the preferred embodiment of the conduit of the present invention.

A solar collector 10 employing the preferred embodiment of the present invention is illustrated generally by way of reference to FIG. 1. Collector 10 includes a housing 12 having a glass front 14 adapted to face the sun. A plurality of elongate collector plates 16 are disposed within housing 12 beneath glass 14 to absorb the solar energy in the form of heat.

A water (or other appropriate liquid) inlet 18 supplies relatively cold water to the top of collector 10, and an outlet 20 is provided for the water at the bottom of the collector after the water has been warmed by the absorption of solar energy. The water flows from inlet 18 to outlet 20 through a plurality of conduits 22 centrally disposed on the respective collector plates 16. The water (or other appropriate liquid) within conduits 22 absorbs the heat which is conducted from the collector plates to the water.

Figure 2A:
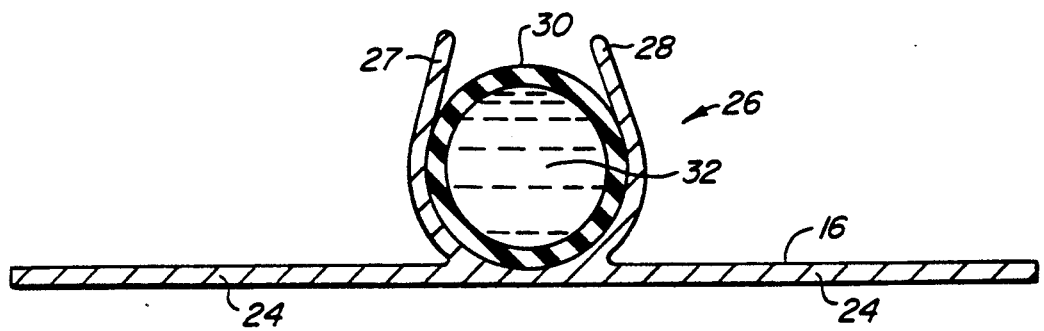
FIG. 2A is a cross-sectional view of the preferred embodiment of the present invention with the conduit in its normal configuration.

A preferred embodiment of the collector plate 16 of the present invention in its normal configuration is illustrated in FIG. 2A. Collector plate 16 preferably comprises a single extrusion of aluminum. The extrusion has a planar portion 24 which is typically 0.050 inches thick and four inches in width and which extends essentially the entire transverse direction of the solar collector. The extrusion also includes a U-shaped portion 26 comprising a pair of legs 27, 28 having a circular shape with an interior diameter of ⅞ inch at the base and and which taper inwardly at angles of 15° at the top. Legs 27, 28 have a vertical dimension of one inch, and the spacing of the tips of the legs is approximately ½ inch in the preferred embodiment.

A normally circular tube 30 is located within U-shaped channel 26 to carry water 32. Tube 30 has an outside radius of ⅞ inch, and legs 27, 28 are shaped to conform to the exterior of tube 30 about more than 50%, but not all, of its circumference. Under normal circumstances, as shown in FIG. 2A, tube 30 will not contact the upper inside portions of legs 27, 28 of U-shaped channel 26.

Tube 30 is stretchable and is preferably constructed of a rubber material which is fully elastic. Silicone rubber is preferred because of the ease with which adjacent tubes can be joined to one another with a silicone sealant. Also, silicone rubber is resistant to the heat found in a solar collector environment and it is impermeable to water. The wall thickness of tube 30 is preferably approximately about 0.050 inches thick so that the tube walls do not provide a significant barrier to heat transfer. The heat in solar collector 10 is typically absorbed by the planar portion 24 of collector plates 16, and conducted through the U-shaped portions 26 to the water 32 or other liquid within tubes 30.

Figure 2B:
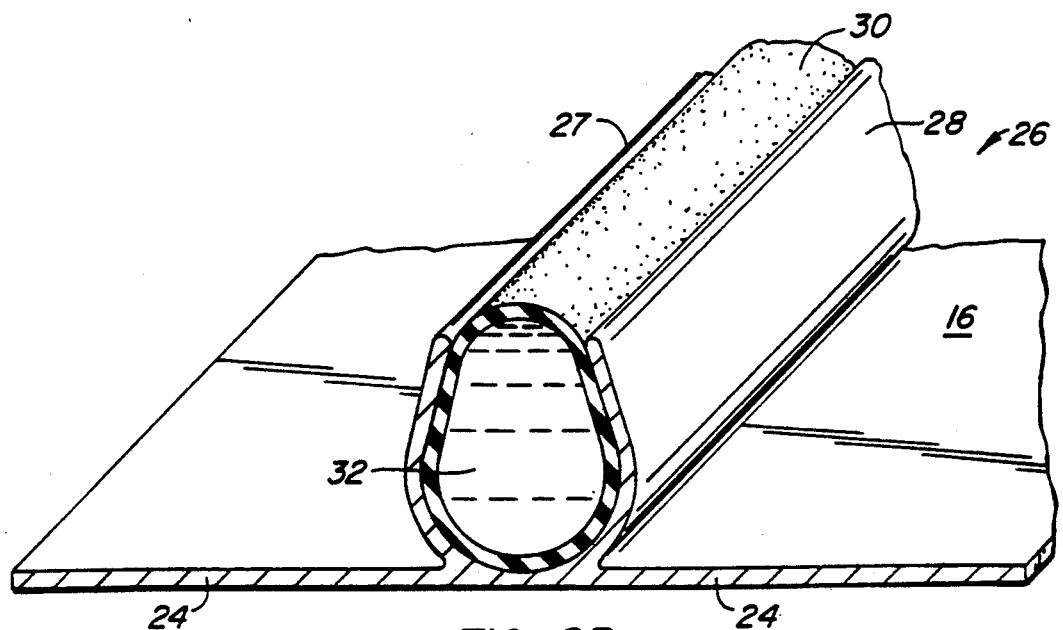
FIG. 2B is a perspective view of the preferred embodiment with the tube portion of the conduit expanded to accommodate freezing of the water.

As water 32 freezes, which will occur on occasion in most solar collector environments, the water will expand approximately 8.5% as it gets less dense near its freezing point. In the collector plate 16 of the present invention, expansion of the water will be accommodated by stretching of tube 30, as illustrated in FIG. 2B. Because of the legs 27, 28 of U-shaped channel 26, tube 30 will not merely expand outwardly, but rather the expansion will be limited to the portion of the circumference not confined by the channel. Because of the inwardly tapered legs 27, 28 of channel 26, the radius of curvature will actually decrease as the tube expands. Normal expansion of tube 30 upon full freezing of water 32 will take the tube to the tips of legs 27, 28. Since the spacing between the tips of legs 27, 28 is one-half inch, the radius of curvature of the unconfined portion of tube 30 will be about ¼ inch, significantly less than the nominal tube radius of ⅞ inch when the water is not frozen.

The stress in the walls of a stretchable tube containing a pressurized liquid is described by the equation:

$$S = P \times \frac{r}{t}$$

where S is the stress, P is the liquid pressure, r is the radius of the tube and t is its wall thickness. When water 32 in tube 30 expands as it freezes, its thickness decreases slightly because of the stretching of the tube, but the radius also decreases, from ⅞ inch as shown in FIG. 2A to ¼ inch as shown in FIG. 2B. Since stress is directly proportional to radius, and inversely proportional to thickness, the reduction in both of these factors means that the stress will remain relatively constant as the liquid freezes. Thus, there is no tendency for tube 30 to rupture as liquid 32 freezes.

Aside from the problem of freezing, the water pressure may increase from time to time in normal operation. If the pressure in water 32 increases, the increase in stress in the tube walls is limited because the increase in pressure will be compensated to some extent by the reduction in radius of curvature. As a result, there is little tendency for tube 32 to rupture in normal service, even when a thin-walled tube is used which will not significantly limit the transfer of heat from collector plate 16 to the water.

While a preferred embodiment of the present invention has been illustrated in detail, it is apparent that modifications and adaptations of that embodiment will occur to those skilled in the art. For example, it would be possible to make the legs of the channel parallel and perhaps still provide sufficient containment of the tube in certain applications. However, it is to be expressly understood that such modifications and adaptations are within the spirit and scope of the present invention, as set forth in the following claims.

What is claimed is:

1. A conduit for a device such as a solar collector comprising:

a collector plate including a planar portion and a rigid elongate U-shaped channel portion, the channel portion of the collector plate intersecting the planar portion at the base of the U-shape and having legs extending away from the planar portion and tapering inwardly with respect to each other; and a tube of elastic material adapted to carry a liquid subject to varying pressures due to freezing and other factors located within the channel portion of the collector plate, the interior surfaces of the legs of the channel portion proximate the planar portion of the collector plate being conformed to the exterior shape of the tube to confine the tube at least 50 percent but not the entirety of the circumference of tube, the distal portions of the legs extending beyond the surface of the tube, whereby the unconfined portion of the tube stretches when the liquid expands with the inwardly tapered legs of the channel portion requiring that the radius of curvature of the unconfined portion of the tube decrease to minimize the chance that the elastic material will burst.

2. The conduit of claim 1 wherein the legs of the channel portion each taper inwardly at an angle of about 15 degrees.

3. The conduit of claim 1 wherein the collector plate is formed from a single extrusion of a metal.

4. The conduit of claim 3 wherein the metal is aluminum.

5. The conduit of claim 1 wherein the tube is constructed of rubber.

6. The conduit of claim 5 wherein the tube is constructed of silicone rubber.

7. The conduit of claim 1 wherein the tube has a circular cross-section when the liquid is not frozen.

8. The conduit of claim 1 wherein the liquid is water.

* * * * *